E. H. PIERSEN.
TELEGRAPH TRANSMITTER.
APPLICATION FILED MAY 31, 1913.
1,289,901.
Patented Dec. 31, 1918.
8 SHEETS—SHEET 1.
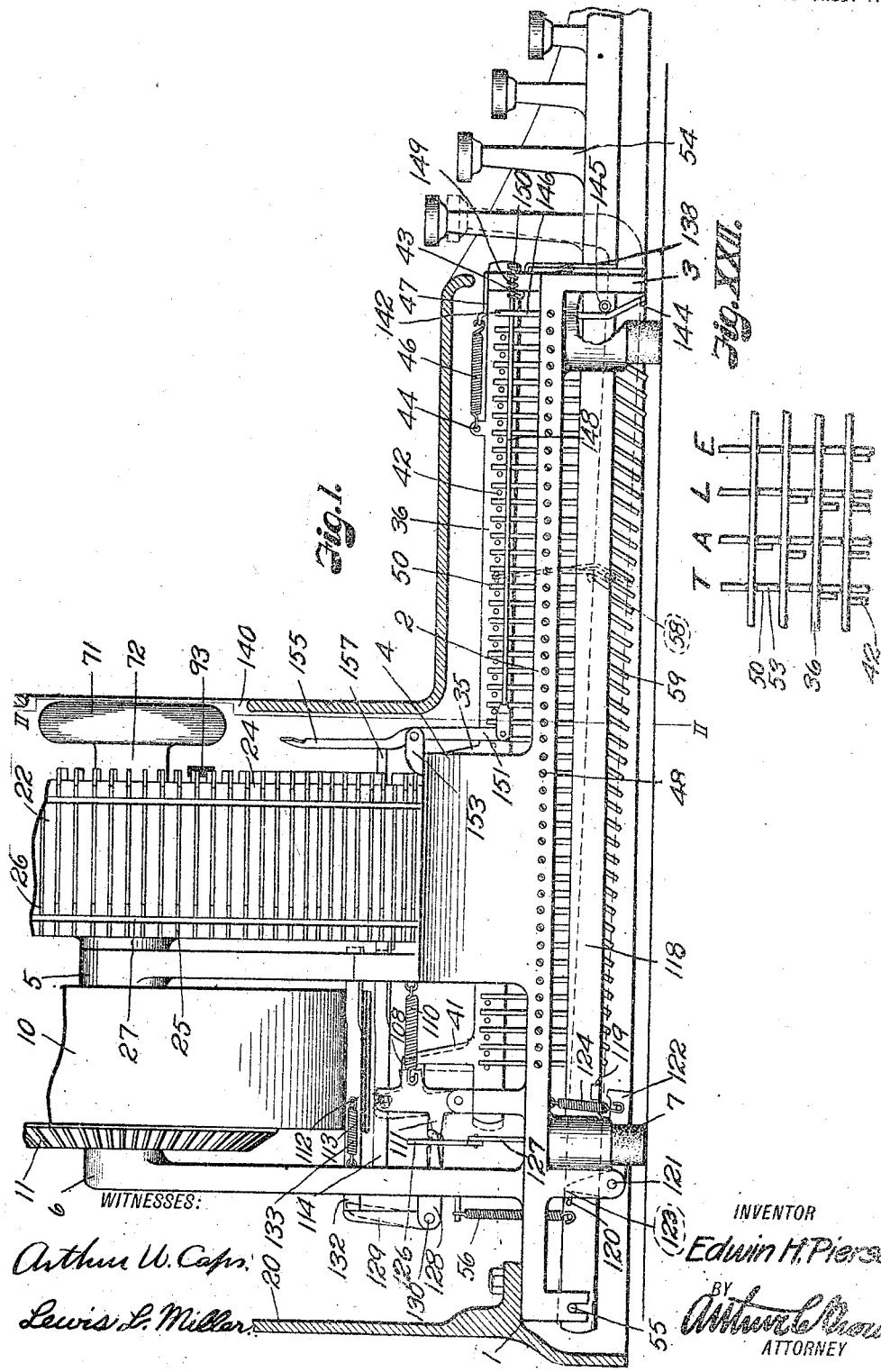
WITNESSES:
Arthur W. Capps.
Lewis L. Miller.
INVENTOR
Edwin H. Piersen,
BY
Arthur C. Brown
ATTORNEY

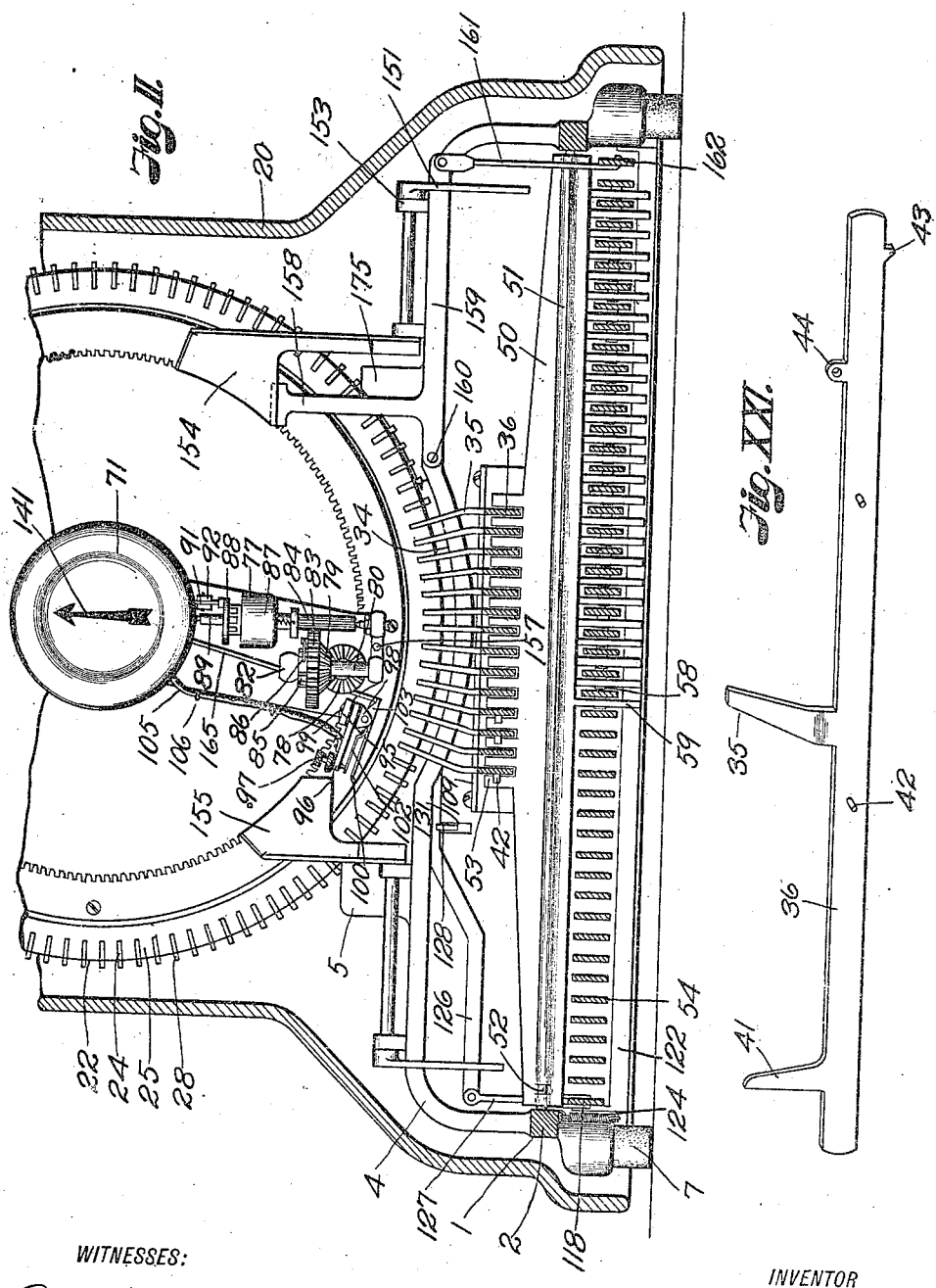

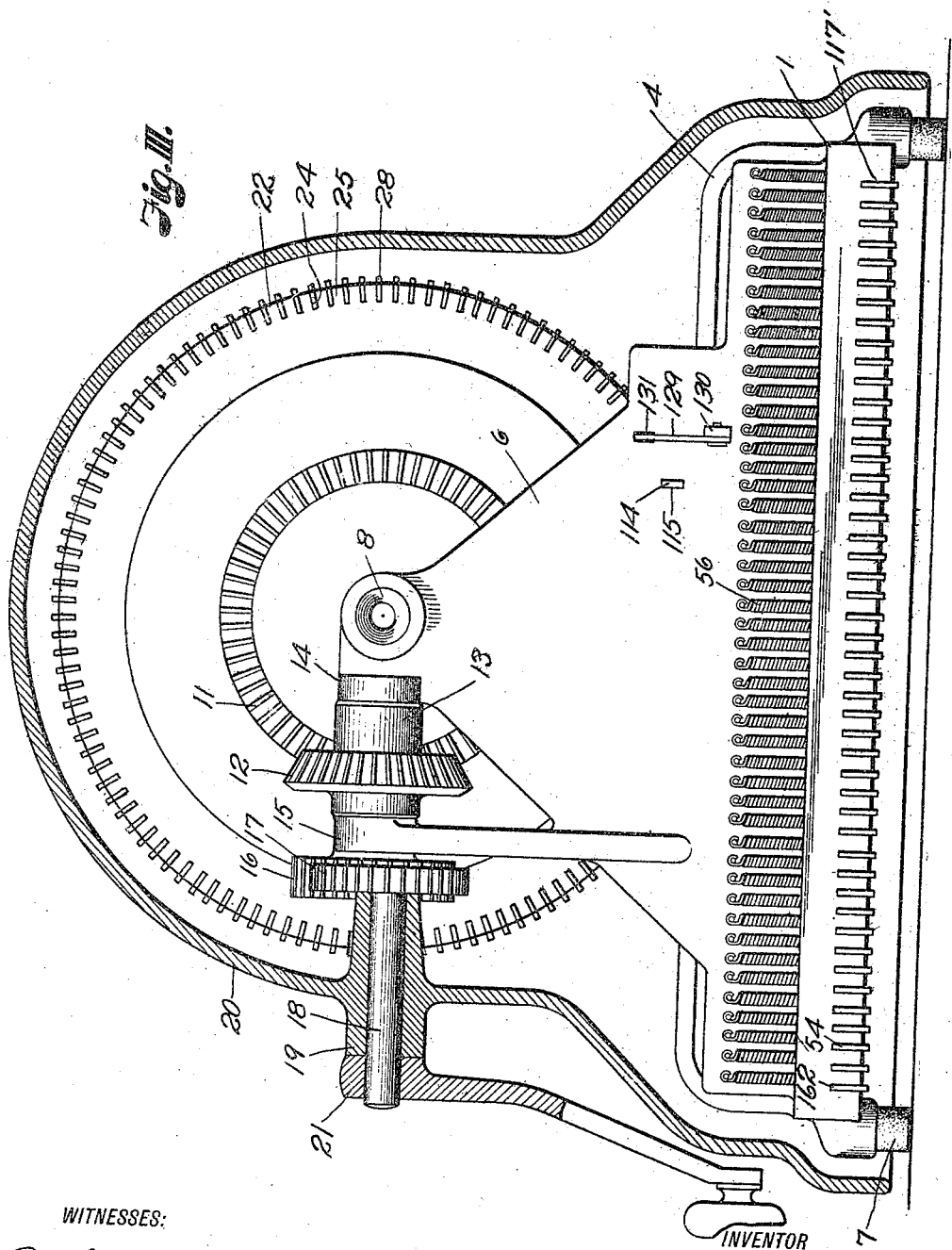

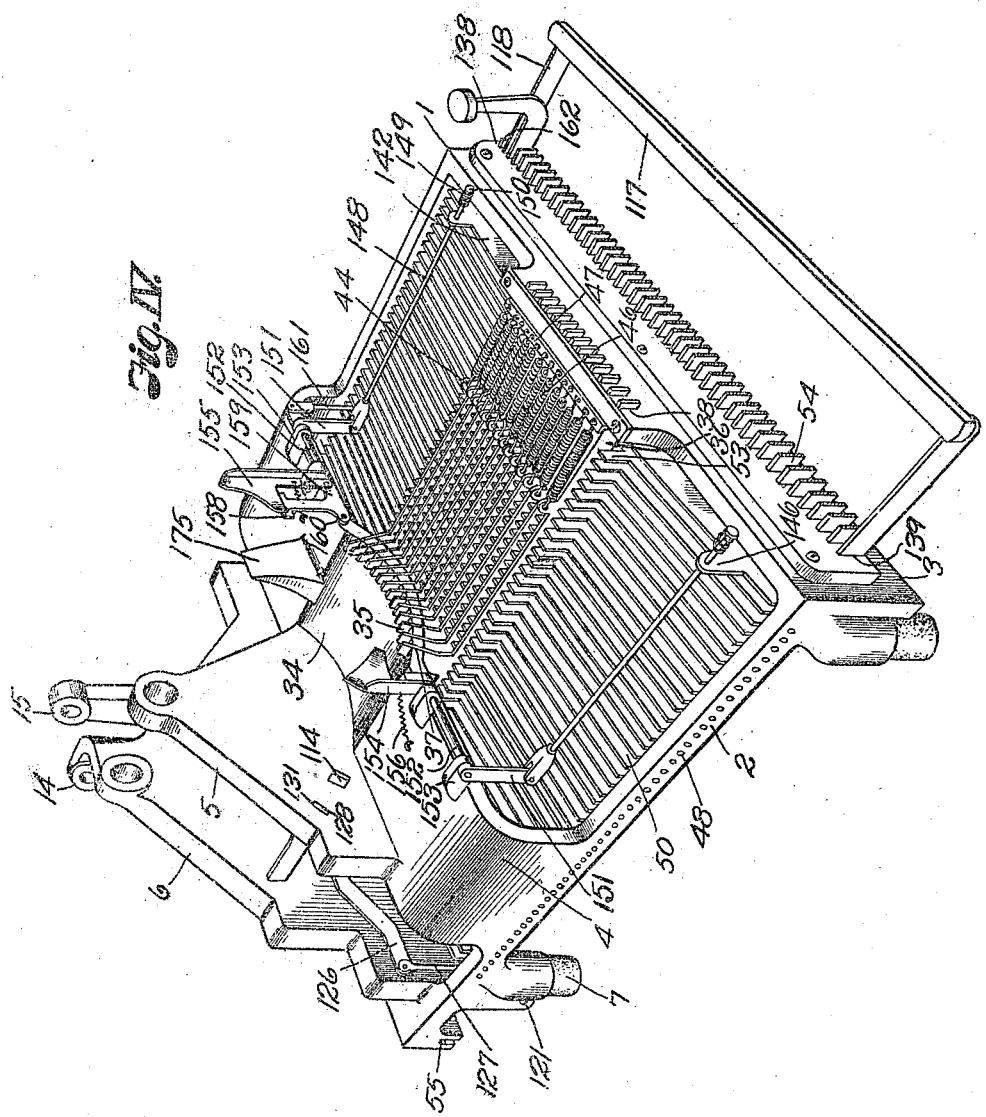

E. H. PIERSEN.
TELEGRAPH TRANSMITTER.
APPLICATION FILED MAY 31, 1913.
1,289,901.
Patented Dec. 31, 1918.
8 SHEETS—SHEET 5.
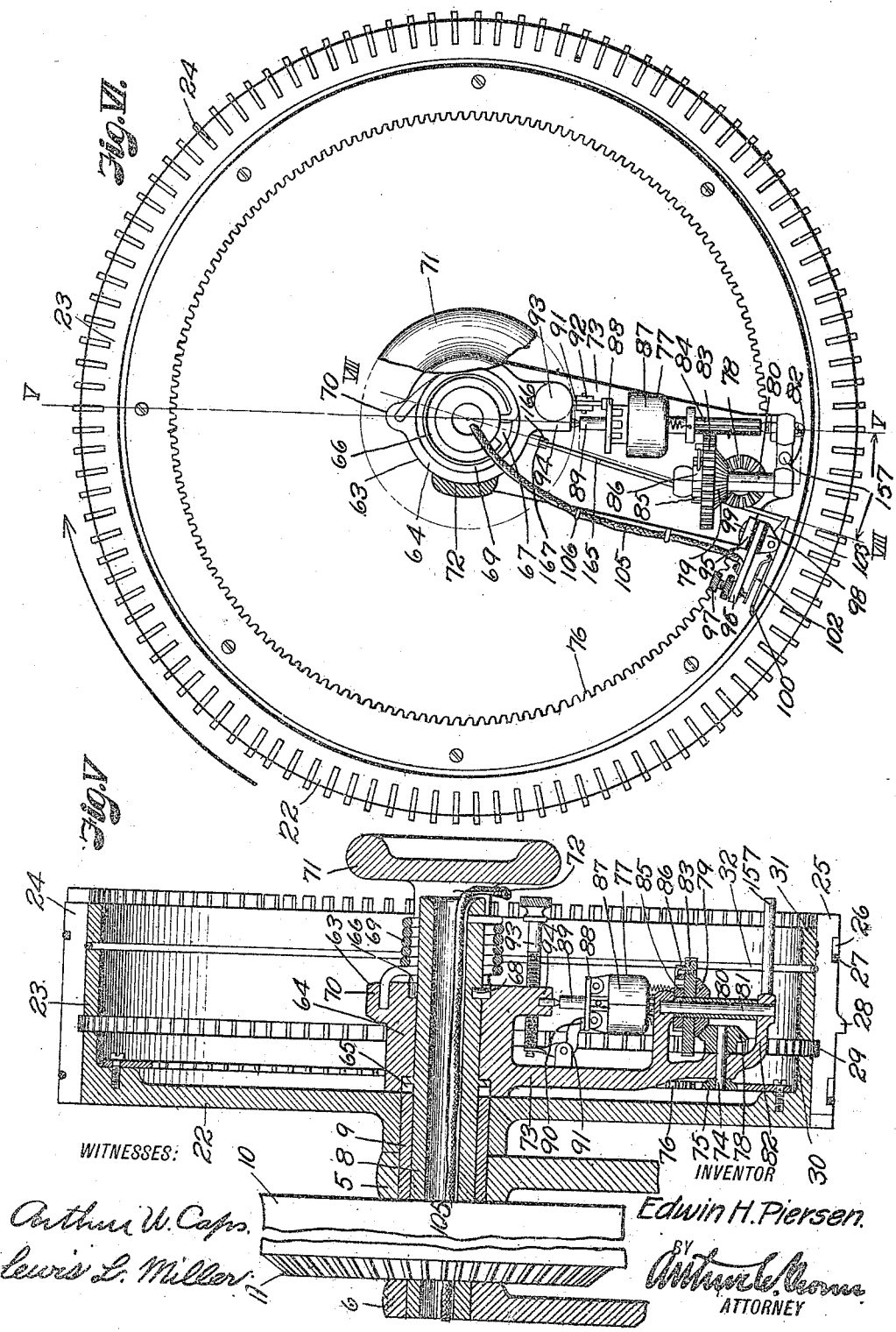
WITNESSES:
Arthur W. Capps.
Lewis L. Miller.
INVENTOR
Edwin H. Piersen.
BY
Arthur W. Browne
ATTORNEY

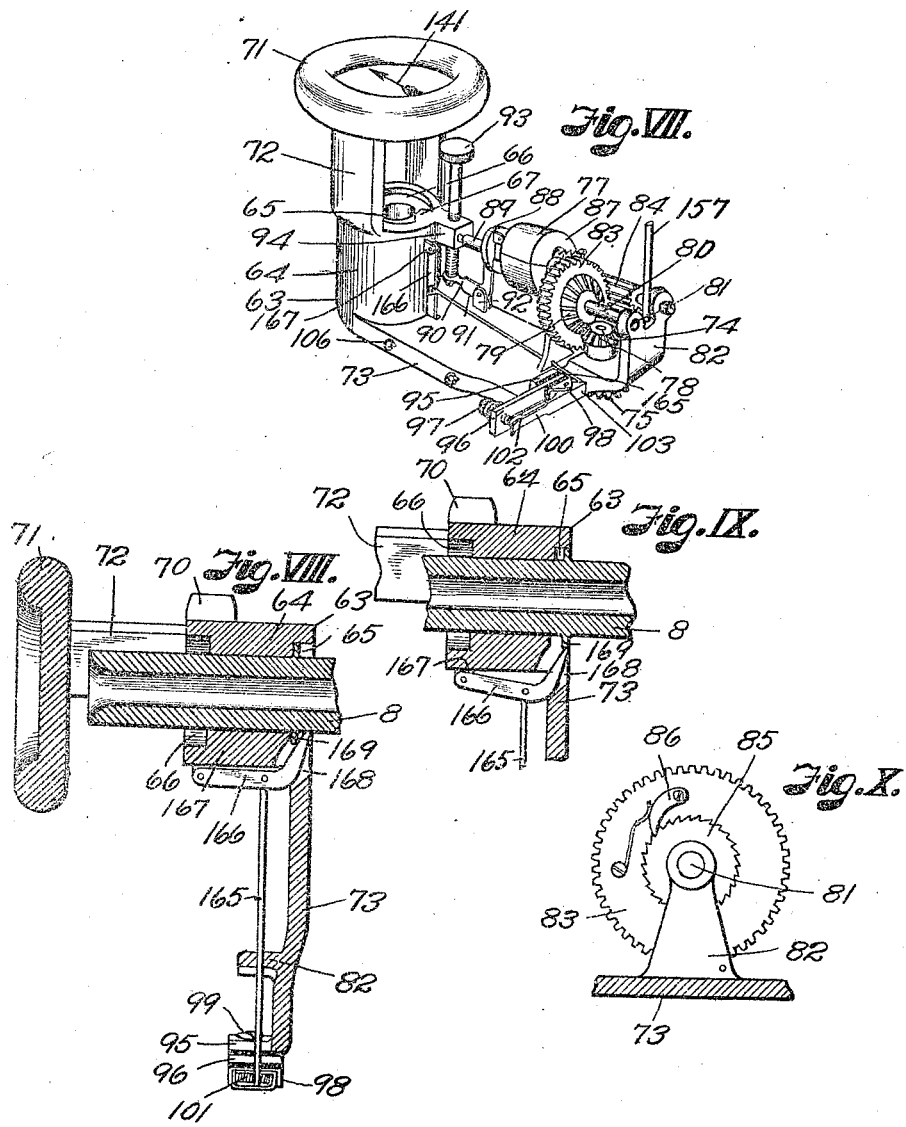

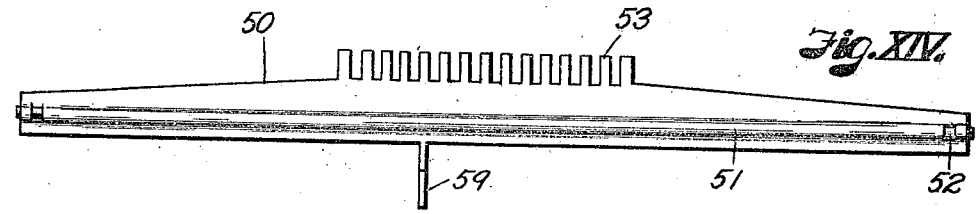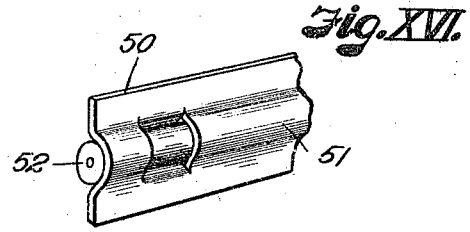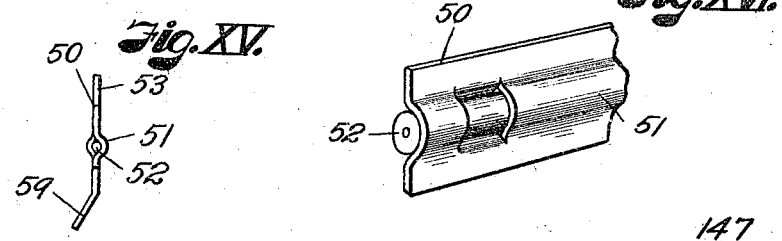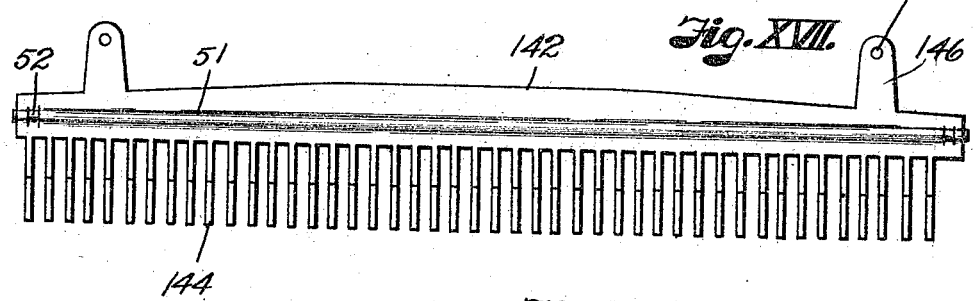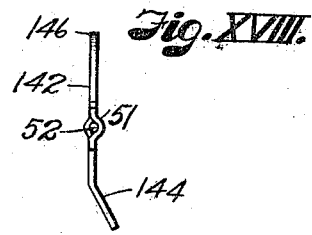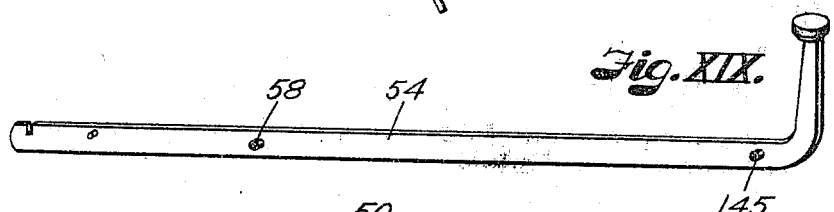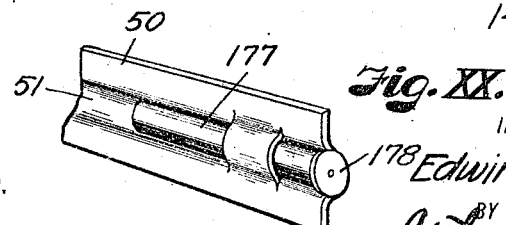

E. H. PIERSEN.
TELEGRAPH TRANSMITTER.
APPLICATION FILED MAY 31, 1913.
1,289,901.
Patented Dec. 31, 1918.
8 SHEETS—SHEET 8.
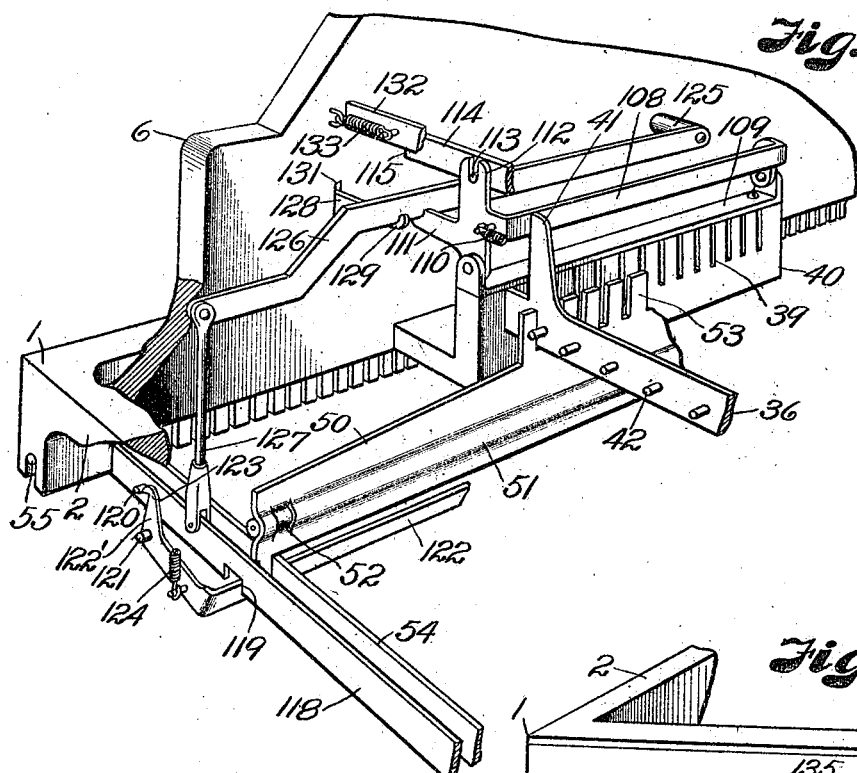
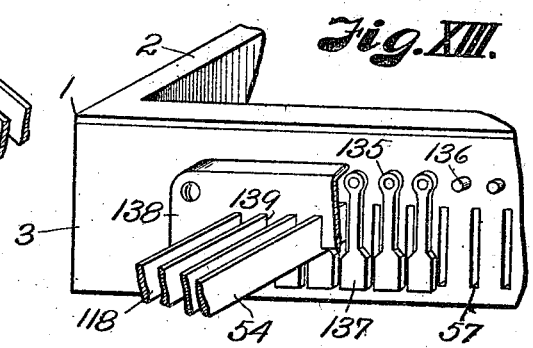
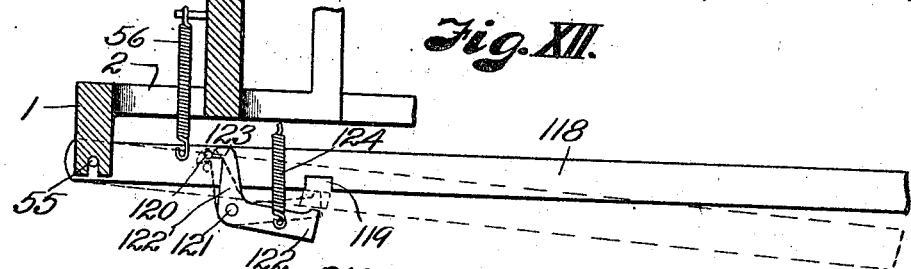
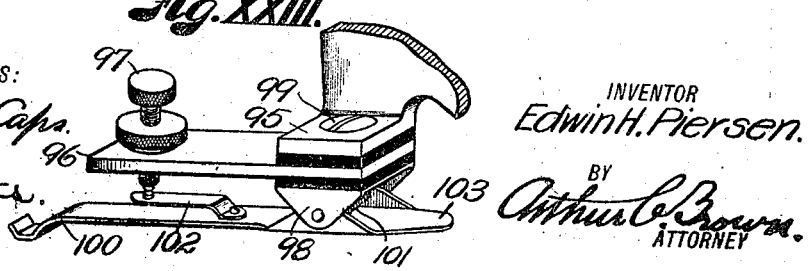
WITNESSES:
Arthur W. Caps.
L. E. Coots.
INVENTOR
Edwin H. Piersen.
BY
Arthur C. Brown.
ATTORNEY.

UNITED STATES PATENT OFFICE.

EDWIN H. PIERSEN, OF TOPEKA, KANSAS, ASSIGNOR TO THE PIERSEN TELEGRAPH TRANSMITTER COMPANY, OF TOPEKA, KANSAS, A CORPORATION OF KANSAS.

TELEGRAPH-TRANSMITTER.

1,289,901.  Specification of Letters Patent.  Patented Dec. 31, 1918.

Application filed May 31, 1913. Serial No. 771,048.

*To all whom it may concern:*

Be it known that I, EDWIN H. PIERSEN, a citizen of the United States, residing at Topeka, in the county of Shawnee and State of Kansas, have invented certain new and useful Improvements in Telegraph-Transmitters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to telegraph transmitters, and more particularly to a device of that type whereby characters are set by means of a keyboard and transformed into electrical impulses through the medium of a circuit closer, in order to transmit characters corresponding with those in the Morse or other telegraphic code.

It is the object of the present invention to provide an apparatus comprising improved means for setting the characters, transforming mechanical characters into electrical impulses, and providing for storage of the characters so that the setting operation may be carried on irrespective of the speed of operation of the circuit closer.

More particularly the invention consists of a mechanical character mechanism comprising a revoluble wheel having character slides in its periphery which are adapted for actuation to move contact portions thereof into position for engagement by the brush of a circuit closer, and a circuit closer, revolubly mounted within the wheel and adapted for contact with the slides in order to close the telegraphic circuit and transmit electrical impulses of proper length and number to correspond with code characters, the wheel and circuit closer being adapted for governable travel in opposite directions in order to provide for storage of the characters in the wheel.

The setting mechanism comprises a system of key levers and crossbars adapted for actuation by the key levers, and which in turn are adapted for actuating setting levers, whereby the character slides are moved to active position, the setting levers being arranged in slots in the crossbars and provided with pins, whereby one or more of said levers may be actuated in order to set the proper number of slides in correct relation for imparting the signal, in this way providing for the use of the same setting lever for actuating slides for a number of different characters, and thereby reducing the number of parts to a minimum.

In order to adapt the circuit closer for use with a setting mechanism of this type I construct the brush of the circuit closer so that it will simultaneously engage two adjacent character slides and provide for the setting of two adjacent slides for forming a dash, and a single slide for a dot, in this way making it possible to utilize any of the setting levers alone as a dot or in combination with an adjacent lever for setting a dash.

In order to properly separate the words of a message I provide means for holding the character wheel by the last element of a character member, and provide the apparatus with an escapement which may be released by a space bar, and when actuated forward the wheel a distance corresponding with three telegraphic dots, which is the usual spacing between words in sending a message.

In accomplishing the above named objects, and others which are mentioned in the following specification, I have provided improved details of structure, the preferred forms of which are illustrated in the accompanying drawings, wherein:—

Figure I is a side elevation of a telegraph transmitter constructed in accordance with my invention, the case being in section, and the upper part of the wheel being broken away.

Fig. II is a cross section on the line II—II, Fig. I.

Fig. III is a rear elevation of the machine, the case being in section.

Fig. IV is a perspective view of the selecting mechanism.

Fig. V is a sectional view of the character slide and accumulating wheel, showing the governor mechanism.

Fig. VI is a front elevation of the same.

Fig. VII is a perspective view of the circuit closer and its governing mechanism.

Fig. VIII is a sectional view of the same, showing the mechanism for lifting the contact point.

Fig. IX is a detail section of the circuit closer mounting, showing the lever for tripping the circuit closer.

Fig. X is an elevation of one of the governor actuating gears.

Fig. XI is a detail perspective view of a portion of the rear of the machine, showing the accumulating wheel escapement and space key lock.

Fig. XII is a sectional elevation of a portion of the rear part of the machine, showing the action of the space key lock.

Fig. XIII is a detail perspective view of the key lever latch board, parts being broken away for better illustration.

Fig. XIV is a front elevation of one of the transverse selecting bars.

Fig. XV is an end view of the same.

Fig. XVI is a detail, perspective view of one end of the bar, showing the reinforcing rib and bearing mounting.

Fig. XVII is a front elevation of the touch indicating bar.

Fig. XVIII is an end view of the same.

Fig. XIX is a perspective view of one of the key levers.

Fig. XX is a detail perspective view of one of the transverse selecting bars, showing a modified form of mounting.

Fig. XXI is a detail perspective view of one of the longitudinal selecting bars.

Fig. XXII is an enlarged plan view of a portion of the longitudinal and transverse selecting bars, showing the relation of the parts.

Fig. XXIII is a detail view of the circuit closer.

Referring more in detail to the parts:—

The working parts of the transmitter are mounted in a metallic frame 1 comprising side members 2, a front apron 3, a base arch 4 within which the lower portion of the character wheel is adapted to travel and wherein the character slides are set by the lever mechanism hereinafter described, upright standards 5—6 located back of the arched part of the base and adapted for carrying the character wheel axle, and feet 7 upon which the frame is supported.

Fixed in the rear standard 6, and extending forwardly through and beyond the standard 5, is a tubular axle 8 (Fig. V), and revolubly mounted on said axle and journaled in the standard 5 is a sleeve 9, which carries the character wheel and is adapted for actuation from the spring motor 10, whereby all of the driven parts of the apparatus are actuated.

The motor 10 is located between the standards 5—6 and provided with a bevel gear 11 that meshes with a pinion 12 on a shaft 13 journaled in bearings 14 and 15 on the standard 6, and provided with a gear wheel 16 which meshes with a pinion 17 on a shaft 18 that is journaled in a bearing 19 on the casing 20 which incloses the working parts, the shaft 18 being provided with a handle 21 whereby the motor is tensioned.

The character wheel 22 is rigidly mounted on the forward end of the sleeve 9 and comprises a peripheral flange 23 having a plurality of transverse grooves 24 in its periphery for containing slides 25 which are adapted for free movement within the wheel grooves, but are held to the wheel by wire keepers 27 which are located in grooves 26 in the outer edges of the slides, the grooves 26 being of sufficient length to allow required longitudinal travel of the slides.

Each of the slides has a resetting lug 28 on its outer edge adapted for coöperation with a resetting post on the frame, which will presently be described, and has a notch 29 on its inner edge which normally registers with a circumferential groove 30 in the wheel flange, within which the brush of the circuit closer is adapted for travel, arrangement of the brush being such that it will ride free of the character slides when the latter are in normal position, but will wipe the inner edges of same when the slides are moved longitudinally, to bring their full edges across the grooved part 30 of the wheel, each of the slides being also provided with a plurality of notches 31 at its inner edge and near the front end for receiving the latch wire 32 whereby the slides are held in either their inoperative or in one of two operative positions, to insure the proper contact or non-contact with the circuit closer brush, the normal or inoperative position of the slides being such that their front edges project slightly beyond the front edge of the wheel flange.

The wheel 22 is so mounted, and of such diameter, that it lies within a concave 34 in the arched part 4 of the carrying frame, and so that the projecting ends of the character slides 25 may be engaged by the fins 35 of the setting bars 36 which are slidably mounted in slots 37 in the front face of the concave part of the arch 4, in slots 38 in the apron 3 at the front of the frame, and in slots 39 in a sleeve 40 adjacent the standards 6.

The bars 36 are adapted for longitudinal movement through key lever mechanism, presently described, to cause the fins to abut against the ends of the character slides and thereby move the slides to operative position, the fins being radial with the wheel in order to correspond with the arrangement of the slides.

Each bar 36 has a push arm 41 near its rear end for actuating an escapement mechanism upon each actuation of a key lever, has laterally projecting pins 42 for engagement by crossbars forming a transmission between the setting bars and the key levers, has a stop 43 near its forward end for engaging the front apron 3, and has an apertured eye 44 on its upper edge near the front end carrying a spring 46 that is also connected with a hook plate 47 on the apron 3 and yieldingly tensions the setting bar forwardly.

The transverse transmission bars 50, by which the setting bars 36 are actuated from the key levers, are preferably mounted on point bearings 48 (Fig. IV) in the sides of the frame, and each comprises a flat piece of sheet metal set on edge and having a longitudinal rib 51 which is split and back-bent to form a socket to receive the bearing pin 52, the upper edge of each of the transmission bars having spaced fingers 53 lying along the setting bars and adapted for engagement with bar pins 42 when the key levers are actuated in order to push the setting bars rearwardly to cause the fins 35 to engage the character slides and the push arms 41 to engage the escapement mechanism.

A brush in the circuit closer, which will presently be described, is adapted for contacting two adjacent character slides 25 when the latter are both set to operative position, so that should two of the adjacent slides be set the contact will be of sufficient length to represent a telegraphic dash, whereas the contact of the brush with a single slide would indicate a dot. In order, therefore, to set a character including a dot, but one of the setting bars need be actuated and the transverse bar 50 connected with the key lever indicating a dot character would engage but one setting bar pin 42, so that but a single bar would be actuated to actuate a single character slide. For a character represented by a dash the transmission bar for that character lever would engage pins 42 on two adjacent bars and move said bars simultaneously, so that two character slides would be actuated in order to produce a long contact with the circuit closer brush.

When a character represented by a dot and dash is to be set, the transmission bar 50 for that character key engages a single setting bar 36, skips one bar and then engages two adjacent bars, so that the three bars are moved inwardly to set corresponding character slides, so that when the circuit closer brush moves thereover it engages a single slide for a dot, breaks contact and then engages the two slides for a dash.

It is apparent that with a construction of this kind, the same setting bars may be used for different characters, and that the selection is made through the fingers on the transmission bars, combinations for different letters being illustrated in Fig. XXII, wherein it will be noticed that the last pin in each character series is located closer to the transmission bar than the first pins. This is for the purpose of utilizing the last character slide of a unit as a stop for the escapement, as will presently be more fully described.

The key levers 54 for actuating the transmission bars 50 are all mounted on a rod 55 (Fig. XII) which extends through the rear portion of the frame 1, and each key lever is held in elevated position by a coil spring 56 which is connected with pins on the lever and on the standard 6 respectively. The front end of each lever projects through a slot 57 in the frame apron 3, and is turned upwardly to form the key board, each of the key levers being provided with a laterally directed roller 58 (Fig. XIX) for engaging a backwardly turned ear 59 on its particular transmission bar 50 when the key lever is depressed to rock the transmission bar on its point bearings, to move the setting bars for setting the character slides designated by that particular key lever, so that the circuit closer brush would wipe the proper slides for sending the character.

The circuit closer, while adapted for rotary travel concentrically with the wheel, and within the wheel flange, is independent of the wheel and adapted for movement in the opposite direction under tension of a spring, so that as the characters accumulate in the wheel and the latter is moved in one direction, the circuit closer is carried therewith to the extent of the storage, but moves back in the opposite direction in order to send the accumulated characters.

The detailed construction of the circuit closer comprises a frame 63 having a hub 64 revolubly mounted on the main axle 8 and provided with sockets 65 and 66 on its rear and forward faces respectively, a stop 67 being located in the socket in the outer face and adapted for engagement with a pin 68 on the main axle, when the circuit closer is yieldingly tensioned to a starting position by the spring 69 that is mounted on the axle and connected with a boss 70 on a circuit closer hub 64 and automatically returns the circuit closer to its starting position after being carried around by the character and storage wheel, the circuit closer being also provided with a knob 71 which is spaced from the closer frame by arms 72, and thereby the frame and closer parts may be actuated manually when it is desired to repeat or skip a message.

In order to control speed of travel of the circuit closer and obviate confusion, or too rapid sending of the character impulses, I provide a governor mechanism which is mounted on an arm 73 that extends from the frame hub 64 and comprises a revoluble shaft 74 having a gear wheel 75 fixed thereto and meshing with an internal gear 76 on the character or storage wheel 22, so that the shaft is revolved through said gearing when the circuit closer is returned toward its starting position to actuate a governor 77 through the following mechanism:

Fixed on shaft 74 is a beveled pinion 78 which meshes with a gear wheel 79 fixed on a sleeve 80 that is revolubly mounted on a shaft 81 journaled in standards 82 that project laterally from the arm 73.

The sleeve 80 has a gear wheel 83 revolubly mounted thereon and meshing with an elongated pinion 84 forming part of the governor shaft, the pawl 86 being mounted on the side of the gear wheel 83 and adapted for engaging a ratchet wheel 85 that is fixed on the sleeve 80, so that the governor is actuated when the circuit closer is revolved in one direction, but is idle when moved in the opposite direction.

While the governor *per se* may be of any suitable type, I prefer a construction comprising pivotally mounted weights 87 for moving a disk 88 longitudinally on the smooth bar 89 of the governor shaft to cause the disk to engage the friction tip 90 of a bell crank lever 91 which is pivotally mounted between ears 92 on the frame arm 73.

I provide for adjustment of the governor through a regulating screw 93 that is threaded into the boss 94 on the hub 64 and is adapted for regulating the spacing of the friction tip from the disk, in order to vary the sliding travel of the disk.

The circuit closer heretofore mentioned is also mounted on the frame arm 73 and comprises a bar 96 which is mounted on but insulated from a boss 95 at the outer end of said arm and carries a contact screw 97.

Also mounted on the boss 95, and insulated therefrom, is a yoke 98 having electrical connection with the boss 95 through a screw 99.

Pivotally mounted in the yoke 98 is a brush 100 which is yieldingly held toward operative position by a spring 101 contained between the yoke ears and is provided with a contact member 102 that is adapted for engagement with the screw 97 when the brush is rocked by its engagement with the character slides 25 in the wheel 22, outward movement of the brush being limited by engagement of the projecting end 103 with a trip rod 165 hereinafter described.

A circuit wire 105 connects with the bar 96 and extends through eyelets 106 on the frame arm, and through the hollow axle 8 to a main line, the other circuit wire (not shown) being grounded on the frame at any suitable point so that a circuit is completed through the machine frame when the brush makes its contact with the character slides.

In order to control movement of the wheel under tension of the spring motor so that it may be moved to send the characters and form spaces therebetween, I provide an escapement comprising a universal bar 108 (Fig. XI) which is adapted for actuation by the push arm 41 of any setting lever 36 so that the universal bar is actuated upon actuation of any of the key levers, the bar being pivotally mounted on a cap plate 109, and yieldingly tensioned forwardly into position for engagement by the push arms by a spring 110 which is connected with the bar and with a hook on the rear face of the standard 5.

On one end of the universal bar is a rearwardly extending arm 111 and an upwardly extending yoke 112, which latter engages a pin 113 on an escapement slide bar 114 that projects through apertures 115 in the standards 5 and 6 and is adapted to project from the face of standard 5 and in a radial line to the left of the first lefthand setting bar 36 a distance equal to a three-dot space of travel of the circuit closer, so that when the wheel 22 is released by the stop bar 114 it will travel a distance equal to a three-dot space, past the fin 35 of the first left hand setting bar 36 in addition to the distance taken up by the character. Each succeeding character set up is, therefore, spaced from the preceding one by a distance equal to three dots.

As the circuit closer passes over the slides 25 the interval encountered at this point, when transposed into time by the governor controlling the travel of the circuit closer, represents a period equal to three telegraphic dots, which is the customary spacing between characters.

When the circuit closer reaches its neutral position the finger 100 stops in this three-dot space immediately after the transmission of the last element of the character, so that in starting again a short interval will occur before transmission, which will not be recorded in the message.

The escapement bar 114 is adapted for holding the character or storage wheel 22 by engagement with the last character slide used in sending a character unit and releases the wheel to the action of the motor 10 when a key lever is actuated to set a succeeding character, the wheel 22 being held to a limited rotation upon withdrawal of the escapement bar 114 by the engagement of the first active fin 35 to the right of the series by the first idle character slide 25 of the wheel following the last slide in the unit that has been set in advance of such idle member, the wheel being allowed to turn slightly to meet the fin and held by such engagement until the key lever 54 is released and the escapement 114 returns to its normal position where it engages the last active character slide which, as before stated, is projected further through the wheel than the other slides in the unit owing to the location of the pin 42 on the bar 36 representing the last slide in the unit being located closer to the transmission bar than the pins on the other bars in that unit. For example, in the characters shown in Fig. XXII, the letter "T" is represented by two pins 42 projecting from adjacent bars 36, the first pin being spaced slightly from its transmission bar 50, and the second pin lying close against its bar, so that when the transmission bar is rocked forwardly the character slide actuated by the lever 36, having its pin close against the transmission bar under normal conditions, will be pushed farther than the slide actuated from the bar 36 having its pin spaced from the transmission bar, as is readily apparent from the arrangement of the pins.

In the mechanism for setting the letter "E" it is noted that the single pin in that unit lies flush against the transmission bar for the reason that as there is only one character slide to be set, that slide must also serve as the escapement for controlling the storage wheel.

It is apparent that by utilizing the last character slide in each unit as a stop for the escapement, there would be no spacing between words, as the character slides are set equal distances apart throughout the circumference of the wheel.

In order to provide for spacing between the words I utilize a device for spacing the characters an interval equal to three dots of the telegraphic code, which, added to the normal three-dot space between characters, makes a space of six dots between words in a message, this device comprising a space bar 117 which is mounted on the levers 118 lying at each side of the machine and mounted and tensioned as are the regular key levers 54, each of the levers 118 having a notch 119 on its under edge and a pin 120 near its rear end for receiving a universal escapement bar and latching said bar respectively.

The universal escapement bar 122 extends beneath the bank of key levers and has back-turned ends 122' provided with laterally directed studs 121 whereby the bar is pivotally mounted in the machine frame, each of the back-turned ends being provided with a hook 123 which is yieldingly tensioned toward the pins 120 by springs 124 so that the space bar levers 118 are lowered, and the notched parts of the bars receive the upper edge of the universal bar, the hooks 123 will slide over the pins to form a latching engagement therewith, which serves to hold the space bar levers depressed until the universal bar is rocked by tension of any of the key levers, it being apparent from the drawings and description that when any key lever is depressed, the universal bar 122 is rocked to move its hooked end out in engagement with the pins 120 and thereby release the space bar levers so that they may be lifted under tension of their springs.

Pivotally mounted on a stub 125 that projects forwardly from the standards 6 is a lever 126 which is connected with one of the space bar levers 118 through a link 127 and overlies the arm 128 which projects through a slot 131 in said standard and forms part of a bell crank lever 129 that is fulcrumed on a lug 130 on the back of the standard, the vertical arm of said lever being adapted for engagement with a bar 132 which is slidably mounted in both of the standards 5 and 6, and is normally yieldingly held in a rearward position by the spring 133, the front end of said bar 132 being adapted for projection into position for engaging a character slide and for operation reversely to the bar 114, as the lever 126 overlies both the arm 111 and the arm 128 and thereby serves to retract the bar 114 when the bar 132 is projected, the difference in spacing between the bars being equal to the customary three dots.

It is apparent that as the space bar levers are depressed, and the universal bar 22 hooked thereto, that the escapement bar 132 will be held in position for retaining the wheel stationary until a succeeding key lever is depressed against the universal bar 122, to release the latch 123, allow the space bar lever to rise and thereby permit the withdrawal of the escapement bar 132 and the projection of the bar 114, which then continue to act automatically as heretofore described.

In order to prevent the simultaneous actuation of two or more key levers, I provide a device comprising a plurality of latches 135, (Fig. XIII) which are pivotally mounted on pins 136 that project forwardly from the apron 3, the bodies of the latches lying between the key lever slots 57 in the apron, so that the key levers project therebetween and may move vertically in their slots.

The latches have heads 137 at their lower ends, the total space between which is sufficient to permit one key to pass downwardly through the plane of the heads, but which will insure the locking engagement of a second lever bar with the upper faces of adjacent latch heads.

The latches are covered by a hood 138 having slots 139 registering with the apron slots 157 so that the key levers may project forwardly from the frame of the machine.

Inasmuch as the machine is adapted for accumulating a number of characters prior to their transmission, I provide indicators for disclosing the number of characters in storage, one of the indicators consisting of an arrow 141 on the knob 71 of the character slide or storage wheel, adapted to point upwardly when the wheel is at initial position and turn to the right as the characters accumulate, the arrow being visible at all times through an aperture 140 in the machine casing.

In addition to the sight indicator, I provide means for stiffening the touch of the key levers as the wheel approaches its limit of accumulation, such mechanism comprising a bar 142 (Fig. XVII) corresponding with the transmission bars 50 and pivotally mounted in point bearings at the extreme forward end of the machine, the indicator bar being provided with a downwardly and forwardly angling flange 144 which is adapted for engagement by the roller 145 on the key levers when the indicator bar is rocked to a set position.

The indicator bar has an upwardly extending ear 146 at each end provided with an aperture 147 through which rods 148 are projected, each of the rods having a head 150 and a spring 149 located between the head and the ear 146, so that when the rods are drawn backwardly by the circuit closer arm, as presently described, and a key lever is depressed to move a roller 145 against the flange 144 on the indicator bar, tension of the spring will load the key lever so that an operator is notified that the character wheel is near one limit of its travel.

In order to actuate the rods to produce the indication, I pivotally connect each rod, through a link 151, with a shaft 152 which is revolubly mounted in bearings 153 on the machine frame adjacent the character wheel, and provide each shaft 152 with a shoe 154—155 having springs 156 whereby they are yieldingly tensioned backwardly or in position for engagement by a pin 157 on the circuit closer arm 73 to rock the rods 148 and indicator bar, so that the rollers 145 on the key levers will engage said bar and depress same against the tension of springs 149 when the character slide wheel is approaching either limit of its travel.

In order to lock the keyboard when the storage wheel has reached its limit, I pivot a lever 159 on a pin 160 on the machine frame so that an arm 158 thereof is engaged by the pin 157 to rock the lever and actuate a link 161 connected therewith, and lift a lever 162 which is pivotally mounted in the casing and extends through a slot 57 in the apron 3, and between pendant latch members 137, so that when the storage wheel has reached its limit, the latch bar is rocked to project its forward end between the latch pendants and close the heads together to prevent the actuation of a key lever.

In order to eliminate a message or character, or to repeat same without repeating the actuation of the key levers, I provide mechanism for lifting the circuit closer brush so that it may be turned over the active character slides to a desired position, either back of or in advance of its pickup position, so that when it is replaced in active coöperation with the character slides, it will travel over the previously brushed slides to repeat a message, or may jump active slides to obviate transmission of the characters represented thereby, such mechanism comprising a rod 165 (Figs. II, VIII and IX), which is slidably mounted in standards 82, and bears against the rearwardly projecting lip 103 of the circuit closer brush 100, so that when the rod is depressed the brush will be lifted to pass freely over the character slides.

The rod 165 is connected with a lever 166 which is pivotally mounted on an ear 167 of the main hub 64 and projects through a slot 168 in the circuit closer arm 73 to engage a collar 169 on the axle 8, so that when the axle is moved outwardly by pulling on the knob 71, the collar 169 will engage the lever 166 and move the rod longitudinally to trip the brush.

In order to automatically reset the character slides after they have performed their function, I provide the frame with a wedge-shaped boss 175 which rises from the base rail 4 at the right hand side of the frame in position for engaging the rear ends of the character slides before they pass into the concave 34 to move the slides forwardly in their seats to their normal or inactive positions.

In Fig. XXI have shown a modified form of point bearing for the transmission bar 50, comprising a pin 177 which is pressed into the slit portions at the ends of the bar, and has a head 178 adapted to bear against the end thereof.

In order to illustrate the use of the machine, I will describe the operation when sending a message:

Presuming the first word in the message to be "let," the key lever for the letter "l" is depressed so that the roller 58 on that lever engages the backturned ear of the special transmission bar 50 for the same letter, rocking the upper end of said bar rearwardly or toward the storage wheel 22, and causing the fingers 53 on the upper edge of the transmission bar to engage pins 42 on three successive setting bars 36 to move said bars rearwardly.

As the bars 36 are moved rearwardly their fins 35 engage three successive character slides 25 in the rotatable wheel 22 and move said slides backwardly until unnotched portions of their inner edges lie across the groove 30 in the character wheel, the pressure of the setting bar fins 35 springing the keeper wire 32 to enable the slides to move, and the last slide at the right of the series being moved farther than the first two slides, for the reason that the last pin 42 in the series of setting bars controlled by that particular transmission bar is located out of line with and back of the first two pins.

When the setting bars are moved rearwardly their push arms 41 engage the universal escapement bar 108 and move said bar backwardly so that the yoke 112 on said universal bar move the escapement stop bar 114 backwardly out of contact with a previously set character slide to free the wheel to the tension of the spring motor 10, so that the wheel is revolved clockwise and beneath the circuit closer, which is yieldingly tensioned in the opposite direction by the spring 69, the circuit closer being carried to the left by the resistance offered by the governor through gears 75 and 76, but immediately returned toward initial position by the spring 69, the backward movement of the circuit closer causing the brush to wipe the edges of the character slides and close a circuit through action with the bars, as heretofore described, the brush being of sufficient width to simultaneously touch two adjacent character slides, so as to continuously close the circuit for a dash when two adjacent slides are in active position, to retain the circuit closed for a space represented by three character slides, to send the character for "l."

As soon as the key lever is released, the escapement stop bar 114 immediately returns to active position, so that it engages the last of the character slides for that character, which has been projected farther than the other two slides, or into position for engagement by the stop. The action of the wheel is immediate upon the release by the escapement, and the action of the circuit closer follows the wheel action, so that when the circuit closer is performing its function a second key lever is depressed, the slides being moved by the second key lever before the escapement bar has released the wheel.

As the second character in the word, "e", consists of a single dot, the pin 42 is located in contact with the transmission bar, so that it is moved the full distance, or so that it may serve as a stop for the escapement bar, to hold the wheel as well as transmit the character.

The next letter in the word, "t", consists of a dash and is formed by moving two adjacent character slides to active position, so that the brush may travel thereover without breaking the circuit, and produce a long closure.

It is apparent that any combination of dots and dashes may be formed with this mechanism, and that each of the setting bars may carry pins for use in combination with a number of transmission bars, as space is left between the transmission bars for idle travel of the pins.

It is also apparent that with this mechanism, the keyboard may operated more rapidly than the characters are sent through the circuit closer, as the wheel and circuit closer move independently and in opposite directions, and as the escapement works from the active character slides so that the wheel may be turned completely around to contain a full set of active slides, which may be wiped by the brush in proper sequence owing to the combination between the escapement and the wheel, which provides for spacing between the character units. This spacing is made possible by the arrangement of the slides which causes the escapement stop 114 to engage the last slide in each unit, and by spacing the stop 114 to the left of the slide setting position a distance equal to three dots, which is represented by three adjacent character slides.

As it is necessary to space between words a distance greater than the space between letters, I have provided the coöperating slide bar 132 which is set by the manipulation of the universal keybar 117 to move the stop 132 outwardly to the left of the bar 114 a distance equal to three spaces, so that when a space between words is to be made the universal bar is actuated to release the wheel from the bar 114 and move the bar 113 into position for engagement with the character slide previously released by the bar 114, thereby providing additional space, equal to three dots, the escapement being again released by manipulation of any of the key levers because of the universal releasing connection between the key levers and the rear universal bar 122.

It is apparent from the foregoing description that the keyboard may be manipulated at a speed independent of the travel of the storage wheel and circuit closer, as the circuit closer will continue to operate independently of the other parts until it is back to its initial position, where it is stopped by the pin 68 on the hub 8, the governor mechanism on the circuit closer controlling the speed of its operation so that it will always work back of the wheel.

Having thus described my invention, what I claim as new therein and desire to secure by Letters Patent, is:—

1. In combination with a circuit closer, a plurality of independent slides having registering notches for receiving said circuit closer, and means for moving said slides to throw the notches out of registration with said circuit closer and with each other to form a telegraph character.

2. In combination with a circuit closer, a plurality of independent slides having registering notches for receiving said circuit closer, and means for throwing said notches out of registration and moving said slides into operative engagement with said circuit closer to form a telegraph character.

3. In combination with a circuit closer, a plurality of independent slides having registering notches for receiving said circuit closer, means for throwing said notches out of registration and moving said slides into operative engagement with said circuit closer, and common means for returning all of said slides to initial position to form a telegraph character.

4. A telegraph transmitter comprising a movable member, a plurality of slides in said movable member having registering notches, a circuit closer, and means for moving said circuit closer through said notches.

5. A telegraph transmitter comprising a movable member, a plurality of slides in said movable member having registering notches, means for moving said slides to break the registration of said notches, and a circuit closer adapted for travel through said notches and for actuation by slides having non-registering notches.

6. A telegraph transmitter comprising a movable member having a channel, a plurality of slides movably mounted in said member, means for moving said slides across said channel, and a circuit closer adapted for travel through said channel and for actuation by slides lying across said channel.

7. A telegraph transmitter comprising a movable member having a channel, a plurality of slides movably mounted in said member and having notches adapted for registration with said channel, means for moving the notched portions of said slides out of registration with said channel and portions of said slide bodies across said channel, and a circuit closer adapted for travel through said slot and for actuation by slide bodies lying across said channel.

8. In combination with a traveler, character slides slidably mounted in said traveler and each provided with a cutout portion, of a circuit closer having a brush adapted for inoperative travel within the cutout portions of said slides, and means for moving said slides to carry contact portions thereof into position for coöperative engagement with the brush of the circuit closer.

9. In combination with a traveler, a circuit closer comprising a brush, character members slidably mounted in said traveler and having recessed parts adapted for inoperative travel adjacent said brush, means for actuating the character members to position for engagement with the brush, and a latch for holding said character members in active or inactive position.

10. In a telegraphic transmitter, a wheel having a circumferential slot and having transverse peripheral grooves crossing the slot, character members slidably mounted in said grooves, a circuit closer having a brush adapted for contact with the character members through said slot, and means for moving said members to active position relative to said brush.

11. In a telegraph transmitter, a wheel having a flange provided with a circumferential slot and with transverse peripheral grooves, of character members slidably mounted in said grooves and having recesses normally overlying the flange slot, a latch for yieldingly retaining said slides in set position, keepers for holding said slides to the flange, and means for moving said slides through the flange grooves, for the purpose set forth.

12. In a telegraph transmitter, a wheel comprising a flange having a plurality of circumferential slots and having transverse, peripheral grooves, character members slidably mounted in said grooves and provided with recesses, a keeper adapted for yielding projection into some of said recesses to retain the character members in desired positions, and a circuit closer having a brush adapted for projection through a flange slot, for the purpose set forth.

13. In a telegraph transmitter, a wheel comprising a flange having a plurality of circumferential slots and having transverse, peripheral grooves, character members slidably mounted in said grooves and provided with recesses, a spring wire located in one of the slots and adapted for projection into some of the recesses to retain the character members in desired positions, and a circuit closer having a brush adapted for projection through another slot, for the purpose set forth.

14. A telegraph transmitter comprising a wheel having a flange provided with transverse, peripheral grooves, character members slidably mounted in said grooves and having grooves in their outer edges, keeper members surrounding the character members and located within the grooves therein, means for moving the character members longitudinally, and a circuit closer adapted for coöperation with said members.

15. In a telegraph transmitter, a wheel provided with peripheral grooves, character members slidably mounted in said grooves and each having a resetting lug on its outer edge, means for moving said character members longitudinally, a circuit closer adapted for coöperation with the character members, and a resetting member adapted for engagement with the lugs on said character members, for the purpose set forth.

16. In a telegraph transmitter, a storage device, individual character slides in said storage device, having registering notches, means for moving said slides to break the registration of said notches, a circuit closer adapted for travel through said registering notches and for actuation by slides in non-registering position and means for moving said storage device and circuit closer in opposite directions.

17. A telegraph transmitter comprising a character device, character members carried by the device, means for actuating the character members, a circuit closer adapted for coöperation with the character members, means for yieldingly tensioning said circuit closer in one direction, and means for moving the character device in a direction opposite to the tension of the circuit closer, and an escapement for controlling the travel of the character device.

18. A telegraph transmitter comprising a character device, character members carried by the device, means for actuating the character members, a circuit closer adapted for coöperation with the character members, means for yieldingly tensioning said circuit closer in one direction, means for moving the character device in a direction opposite to the tension of the circuit closer, an escapement for controlling the travel of the character device, and a governor for controlling travel of the circuit closer.

19. A telegraph transmitter comprising a character device, character members on said device, means for setting the character members, a circuit closer having a brush adapted for wiping the character members, means for actuating the character device, and yielding means for actuating the circuit closer in a direction opposite to the movement of the character device.

20. A telegraph transmitter comprising a character device, character members on said device, means for setting the character members, a circuit closer having a brush adapted for wiping the character members, means for actuating the character device, yielding means for actuating the circuit closer in a direction opposite to the movement of the character device, and a governor on the circuit closer having gear connection with the character device, for the purpose set forth.

21. A telegraph transmitter comprising a character device, a circuit closer concentrically mounted in said character device, a governor for retarding said circuit closer, whereby said circuit closer is carried forward with the character device, means for actuating the character device, and a spring for returning the circuit closer against its governor controlled connection with the character device.

22. A telegraph transmitter comprising a character device and adapted for functional travel in one direction, a circuit closer concentrically mounted in said character device and adapted for travel in the opposite direction, a governor for retarding the backward movement of said circuit closer, whereby said circuit closer is carried forward with the character device, means for actuating the character device, a spring for returning the circuit closer against its governor controlled connection with the character device, and a stop for limiting the travel of the circuit closer under tension of said spring.

23. A telegraph transmitter comprising a character device and adapted for functional travel in one direction, a circuit closer concentrically mounted in said character device, an internal gear on the character device, a governor in the circuit closer having operative connection with the internal gearing, and a spring whereby the circuit closer is actuated in a direction opposite to that of the character device.

24. In a telegraph transmitter, a character device and means for actuating same, a circuit closer adapted for coöperation with said device, means for actuating the circuit closer to induce coöperative engagement thereof with the character device, and means for rendering the circuit closer inoperative to permit idle travel of the circuit closer relative to the character device.

25. In a telegraph transmitter, a character device, a circuit closer comprising a pivotally mounted brush adapted for frictional contact with the character device, and a trip mechanism adapted for rocking the brush out of position for contact with the character device.

26. In a telegraph transmitter, a revoluble character mechanism, a circuit closer mounted concentrically relative to said mechanism and adapted for longitudinal movement on its axis, and trip mechanism adapted for actuation upon the longitudinal movement of the circuit closer to render said circuit closer inoperative.

27. In a telegraph transmitter, revoluble character and circuit closing mechanism having a common axis, said circuit closing mechanism adapted for longitudinal movement on said axis and comprising a pivotally mounted brush adapted for contact with the character mechanism, a protuberance on said axis, a rod adapted for contact with said brush, and a lever connected with said rod and adapted for engagement with the protuberance on the axis when the circuit closer is moved longitudinally, for the purpose set forth.

28. In a telegraph transmitter, the combination with a common axle, of character and circuit closing mechanism revolubly mounted on the axle, a spring fixed on said axle and adapted to tension said circuit closing mechanism in one direction, means for stopping the circuit closer at a determined position, means for revolving the character mechanism in the opposite direction, and means for regulating the speed of revolution of said circuit closer relative to the character mechanism, irrespective of the speed or irregularity of said character mechanism.

29. In a telegraph transmitter, a revoluble character wheel having an internal gear, a circuit closer mounted concentrically with the character wheel, separate means for producing revoluble movement of the wheel and circuit closer in opposite directions, a governor on the circuit closer comprising a revoluble shaft provided with governor weights and a stop device and having a pinion, a separate shaft having a gear wheel revolubly mounted thereon and meshing with the governor pinion and having a gear wheel fixed thereon, a pawl on the revoluble gear wheel adapted for coöperation with the fixed gear wheel, and gearing operatively connecting the revoluble gear wheel with the internal gear on said character wheel for the purpose set forth.

30. In a telegraph transmitter, a hollow axle, a bushing on said axle, a motor operatively connected with said bushing, a character wheel fixed on the bushing, character members carried by the wheel, a circuit closer revolubly mounted on the hollow axle and having a circuit wire leading therefrom and through the axle, a knob on said circuit closer for actuating same, a spring fixed to the axle and to the circuit closer for actuating said closer in a direction opposite to that induced by the motor, a governor on the circuit closer, and gearing connecting the governor with the character wheel.

31. In a telegraph transmitter, character mechanism comprising a plurality of individual slides having registering notches, and setting devices adapted for moving any of the slides to break the registration of the notches and form a telegraph character.

32. In a telegraph transmitter, character mechanism comprising a plurality of individual slides having registering notches, setting devices for moving one or more of the slides to break the registration of the notches, and means for moving the character mechanism to bring the slides into functional relation with the setting devices.

33. In a telegraph transmitter, a circuit closer, a plurality of slides having registering notches for receiving said circuit closer, and means for moving said slides to break the registration of said notches and produce continuous or interrupted contact of the circuit closer and slides.

34. In a telegraph transmitter, character members having notched edges, a circuit closer adapted for simultaneous contact with the notched edges of adjacent members, and means for changing the relation of the notched edges of said members to induce continuous or interrupted contact thereof with the circuit closer when one element of the transmitter is caused to travel relative to the other element.

35. In a telegraph transmitter, a circuit closer, character members having notched edges adapted for contact with said circuit closer, and key mechanism for changing the relative position of the notched edges of said character members.

36. In a telegraph transmitter, a spring tensioned drum, character members in said drum, setting devices adapted for actuating the character members and releasing the drum, key mechanism, and a transmission bar adapted for actuation by the key mechanism and for actuating one or more of the setting devices and bringing others in position.

37. In a telegraph transmitter, character members, setting members adapted for actuating the character members and each having a laterally directed pin thereon, a transmission bar adapted for operatively engaging the said pins, and a key mechanism for actuating the transmission bar.

38. A telegraph transmitter comprising character members, a plurality of longitudinally movable setting devices adapted for actuating the character members, a plurality of key levers, a transmission bar for each key lever, and pins on said setting devices adapted for operative contact by the transmission bars.

39. A telegraph transmitter comprising character members, a plurality of longitudinally movable setting devices adapted for actuating the character members, a plurality of key levers, a transmission bar for each key lever, and pins on said setting devices adapted for operative contact by the transmission bars and located in advance thereof whereby any of the setting devices may be actuated without contacting inactive transmission bars.

40. A telegraph transmitter comprising character members, a plurality of longitudinally movable setting devices, a plurality of laterally projecting pins on said setting devices corresponding in transverse arrangement to the elements of a character, a plurality of transmission bars adapted for engaging transverse sets of said pins, a key lever for each transmission bar adapted for engaging said pins and actuating the proper number of setting devices for setting a required number of character members to transmit a character indicative of a letter or symbol indicated by the relative key mechanism.

41. A telegraph transmitter comprising character members, longitudinally movable setting bars adapted for engagement with the character members, pins on said setting bars arranged in sets on the several bars, key members, a transmission bar for each key member, and a plurality of upwardly extending fingers on each transmission bar adapted for operatively engaging a set of pins on the setting members, for the purpose set forth.

42. A telegraph transmitter comprising a plurality of character members, key levers, transmission bars having spaced fingers, longitudinally movable setting bars seated between said fingers and having laterally directed members adapted for operative engagement by the transmission bar fingers whereby the setting members are moved to operative engagement with the character members.

43. A telegraph transmitter comprising a plurality of character members, key levers, transmission bars having spaced fingers, longitudinally movable setting bars seated between said fingers and having laterally directed members adapted for operative engagement by the transmission bar fingers whereby the setting members are moved to operative engagement with the character members, the laterally projecting members on the setting members being arranged in sets on the several members, and the last projecting member in each set being arranged rearwardly of the forward members, for the purpose set forth.

44. In a telegraph transmitter, a plurality of character members, a plurality of setting devices adapted for operative engagement with the character members, pivotally mounted transmission bars adapted for actuating the setting members and having contact flanges, and pivotally mounted key levers having rollers adapted for contacting the transmission bar flanges, for the purpose set forth.

45. In a telegraph transmitter, a revoluble wheel having an inwardly opening slot, circumferentially arranged character members slidably mounted in said wheel and exposed through said slot, longitudinally movable setting bars having fins radial with the character members and adapted for operative engagement therewith, key mechanism for actuating the setting devices, and a circuit closer concentrically mounted in said wheel and adapted to engage said character members through the slot in said wheel.

46. In a telegraph transmitter, a traveler, character members mounted in the traveler, setting devices for actuating the character members, means for selectively actuating the setting devices, and an escapement adapted for interrupting movement of the traveler and for universal actuation by the setting devices.

47. In a telegraph transmitter, a traveler, character members mounted on the traveler, a setting device for actuating the character members and for holding the traveler by contact with inactive character members, and an escapement mechanism for holding the traveler and operable by the setting device.

48. In a telegraph transmitter, a character wheel, a plurality of longitudinal character members mounted thereon, setting devices for said members, an escapement comprising a universal bar adapted for actuation by the setting devices, and a stop bar adapted for engagement with the last active character member in each character unit.

49. In a telegraph transmitter, a traveler, character members mounted in the traveler, setting devices for said members, a universal escapement adapted for actuation with each actuation of any of the setting devices, an independent escapement, and a space bar for actuating the independent escapement.

50. In a telegraph transmitter, a traveler, character members mounted in the traveler, setting devices for said members, a universal escapement adapted for actuation with each action of any of the setting devices, an independent escapement, a space bar for actuating the independent escapement, a latch for holding the independent escapement after actuation of the space bar, and key mechanism for actuating the setting devices and releasing said latch.

51. A telegraph transmitter comprising a character device, setting mechanism for the character device including key levers, an escapement adapted for actuation following the actuation of any key lever, a space lever, an independent escapement adapted for actuation by the space lever, a latch for holding the independent escapement and comprising a universal bar adapted for actuation by any of the key levers.

52. In a telegraph transmitter, a traveler, character members mounted in the traveler, means for setting the character members comprising key levers, an escapement adapted for actuation following the actuation of said key levers, a space lever, an independent escapement comprising a stop bar and a lever for actuating same, a lever for actuating the stop lever and having connection with the space lever, and a latch adapted for holding the independent escapement in active position and comprising a universal bar adapted for actuation by any of the key levers to rock the latch and release said independent escapement.

53. In a telegraph transmitter, a revoluble character wheel and means for actuating same, character members, setting devices for the character members, key levers for actuating the setting devices, an indicator bar, a pivotally mounted stop adapted for actuation as the character wheel approaches either limit of its travel, means for establishing yieldable connection between the stop and said indicator bar, and means on said key levers for engaging said indicator bar when the latter is in active position.

54. A telegraph transmitter comprising a character device, a circuit closer concentrically mounted in said character device and having geared connection therewith, a governor for controlling said gearing, whereby the circuit closer is carried forward by the increased travel of the character device, and a spring for returning the circuit closer according to its governor controlled connection.

55. In a telegraph transmitter, a circuit closer tensioned in one direction, a character device tensioned in the opposite direction and adapted for intermittent travel, gearing connecting the circuit closer and character device, and a governor operatively connected with said gearing for controlling the relative movement between the circuit closer and character device irrespective of the intermittent movement of the latter.

56. In a telegraph transmitter, a revoluble character wheel, means for tensioning said wheel in one direction, a circuit closer revolubly mounted in said wheel and tensioned in the opposite direction, an escapement for releasing said character wheel to its tensioning means, a plurality of key levers for actuating said escapement, a plurality of detents pivotally mounted between said key levers and adapted to permit but one key lever to be depressed at a time, a pivotally mounted stop, a link on said stop, a pivotally mounted bar connected with said link and adapted for projection between two of said detents to lock the key levers, and a pin on said circuit closer adapted to actuate said stop when said circuit closer has reached its maximum position.

57. In a telegraph transmitter, a storage element, a plurality of radially disposed arms, character members integral with said arms for functioning the storage element, a keyboard for actuating the character members and a transmitter element operable from the storage element for transmitting telegraphic characters.

58. In a telegraph transmitter, storage and transmitter elements, a keyboard, a plurality of levers operable from the keyboard, a plurality of slides operable from the levers, a plurality of arms operable from the slides and a second set of slides operable from said arms for functioning said storage and transmitter elements to transmit telegraphic characters.

59. In a telegraph transmitter, a plurality of normally inert members having alining shoulders, means for moving said shoulders out of alinement to produce telegraphic characters, and means for transmitting said characters.

60. In a telegraph transmitter, a storage element, a plurality of slides in said storage element having alining shoulders, a transmitter element, a keyboard for moving said slides to break the alinement of the shoulders and form telegraphic characters, and means for automatically moving said transmitter relative to the storage element to transmit said characters.

61. In a telegraph transmitter, a storage element, a plurality of slides in said storage element having alining shoulders, a transmitter element, means for moving said slides to break the alinement of the shoulders and form telegraphic characters, and means for automatically moving said transmitter relative to the storage element to transmit said characters.

62. A telegraph transmitter comprising a character device, character members carried by the device, means for actuating the character members, a circuit closer adapted for coöperation with the character members, means for yieldingly tensioning the circuit closer in one direction, means for manually regulating said tensioning means to vary the speed of the circuit closer, means for moving the character device in a direction opposite to the tension of the circuit closer, and an escapement for controlling travel of the character device.

63. A telegraph transmitter comprising a character device, a circuit closer adapted for coöperation with the character device, means for tensioning said character device in one direction, means for yieldingly tensioning said circuit closer in the opposite direction, an escapement for controlling the character device, a governor for controlling the circuit closer for the purpose set forth, and manually operable means for regulating the governor.

64. A telegraph transmitter comprising a character device and a transmitting device having geared connection with one another, means for tensioning said devices in opposite directions, and a manually operable governor for said geared connection for changing the direction of travel of said transmitting device.

65. A telegraph transmitter comprising a character device and a transmitting device having geared connection with one another, means for tensioning said devices in opposite directions, a governor for said geared connection for changing the direction of travel of said transmitting device, and means for manually regulating said governor while the character and transmitting devices are in motion.

66. In a telegraph transmitter, a character device, a transmitting device, means for moving said transmitting device past said character device to transmit telegraph characters, means for retracing and again moving said transmitting device past said character device to repeat said characters, and means for defunctioning said transmitting device during the retracing operation.

67. In a telegraph transmitter, a storage device, a transmitting device, means for moving the transmitting device past the storage device to transmit telegraph characters, means for retracing and again moving said transmitting device over all or any part of said storage device to repeat all or any part of said characters, and means for defunctioning said transmitting device during the retracing operation.

68. In a telegraph transmitter, a character device, a transmitting device, means for moving the transmitting device past said character device to transmit telegraph characters, and means for defunctioning said transmitting device and eliminating the character prior to transmission.

69. In a telegraph transmitter, a character device, a transmitting device, means for moving the transmitting device past said character device to transmit telegraph characters, means for manually turning said transmitting device to eliminate all or any part of said characters prior to transmission, and means for defunctioning said transmitting device during the eliminating operation.

70. In a telegraph transmitter, a character device and a transmitting device movable relative to each other, governor controlled gearing for regulating the relative movement between said devices, means for storing characters in the character device, means for manually moving the transmitting device to eliminate the character prior to transmission and means for defunctioning the transmitting device during the eliminating operation.

71. In a telegraph transmitter, a character device, a transmitting device movable relative to each other, governor controlled gearing for regulating the relative movement between said devices, means for storing characters in the character device, and means for defunctioning said transmitting device and releasing said device from the governor controlled gearing to eliminate said character prior to transmission.

72. In a telegraph transmitter, a character device, a transmitting device, individual motors for driving said devices and gearing for maintaining relative movement between said devices.

73. In a telegraph transmitter, a character device, a transmitting device, independent motors for driving said devices, gearing for maintaining relative movement between said devices and a governor for said gearing.

74. In a telegraph transmitter, a character device, a transmitting device, governor controlled gearing between said devices, and independently operable motors for driving said devices.

75. In a telegraph transmitter, a character device, a transmitting device, an escapement for the character device, governor controlled gearing for the transmitting device having connection with the character device and an individual motor for each of said devices.

76. In a telegraph transmitter, the combination with a character device, a motor for driving said device and an escapement between the motor and character device, of a transmitting device, a second motor for driving said transmitting device, gearing between the transmitting device and character device and a governor in said gearing for regulating the movement of the transmitting device relative to the character device.

77. In a telegraph transmitter, a character device, a transmitting device, separate motors for driving said devices, means for manually turning the transmitting device against the tension of its motor without changing conditions between the character device and its motor.

In testimony whereof I affix my signature in presence of two witnesses.

EDWIN H. PIERSEN.

Witnesses:
ARTHUR W. CAPS,
LETA E. COATS.